(No Model.) 2 Sheets—Sheet 1.
V. SWANFELDT.
BROADCAST SEEDING MACHINE.
No. 454,158. Patented June 16, 1891.
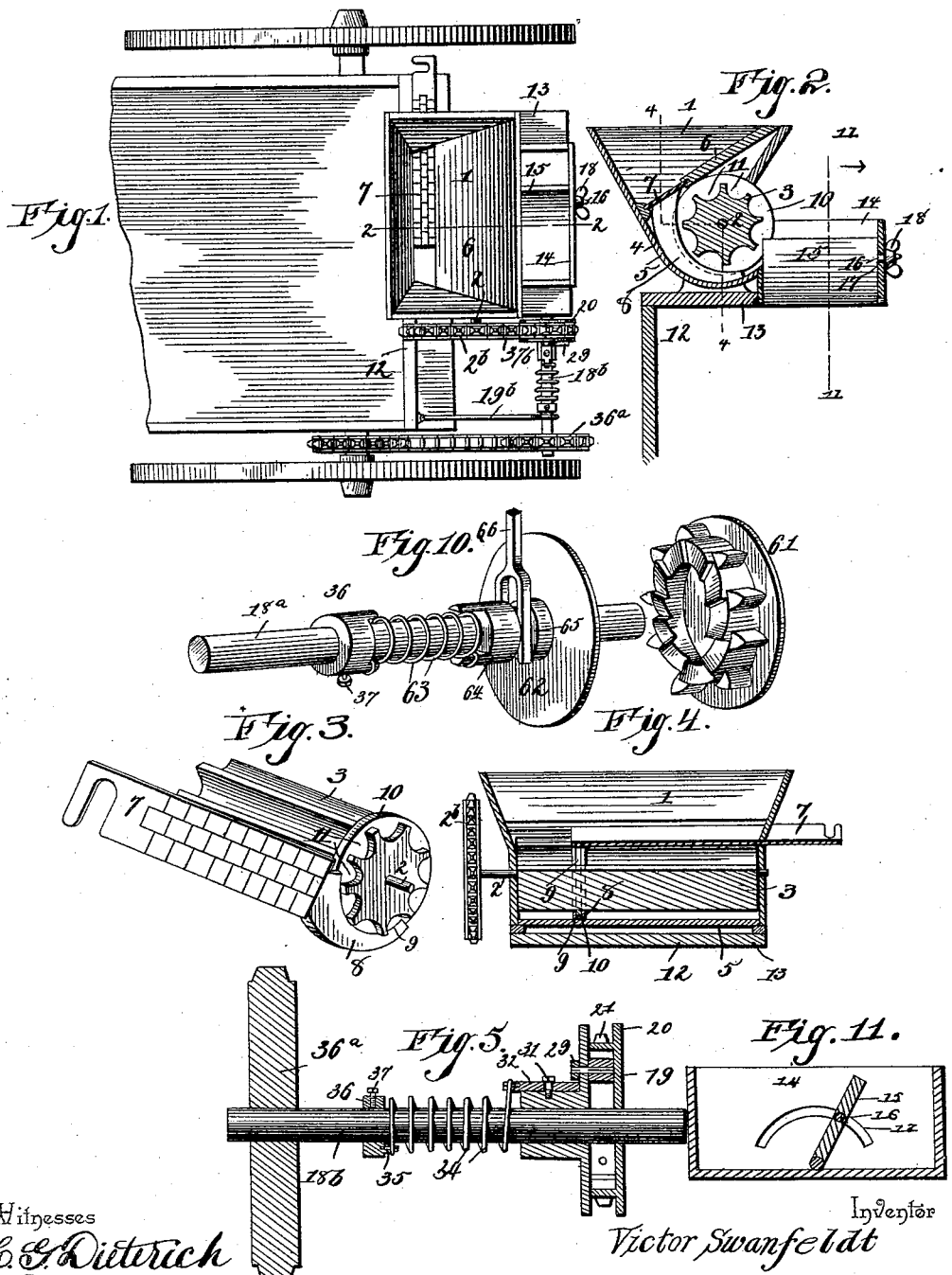
Witnesses
H. G. Dieterich
Wm. Bagger
Inventor
Victor Swanfeldt
By his Attorneys,
C. A. Snow & Co.

(No Model.) 2 Sheets—Sheet 2.

V. SWANFELDT.
BROADCAST SEEDING MACHINE.

No. 454,158. Patented June 16, 1891.

Witnesses
H. G. Dieterich
Wm. Baggers

Inventor
Victor Swanfeldt
By his Attorneys,
C. A. Snow & Co.

UNITED STATES PATENT OFFICE.

VICTOR SWANFELDT, OF CLARENCE, ILLINOIS.

BROADCAST SEEDING-MACHINE.

SPECIFICATION forming part of Letters Patent No. 454,158, dated June 16, 1891.

Application filed January 14, 1891. Serial No. 377,718. (No model.)

*To all whom it may concern:*

Be it known that I, VICTOR SWANFELDT, a citizen of the United States, residing at Clarence, in the county of Ford and State of Illinois, have invented a new and useful Broadcast Seeding-Machine, of which the following is a specification.

This invention relates to broadcast seeding-machines, and it is an improvement on the device of this class for which Letters Patent of the United States, No. 432,648, were issued to myself on the 22d day of July, 1890.

My present invention consists in certain improvements in the detailed construction, arrangement, and combination of parts, which will be hereinafter fully described, and particularly pointed out in the claims.

Figure 6:
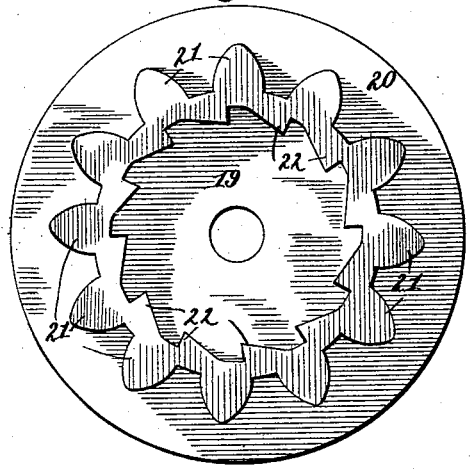
Figure 7:
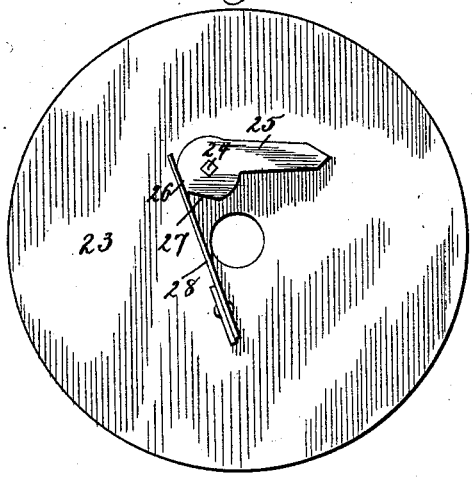
Figure 8:
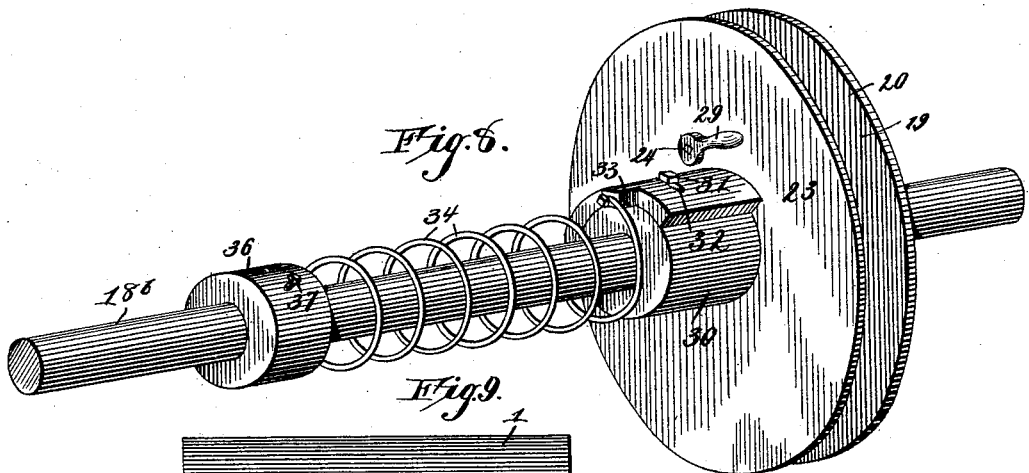
Figure 9:
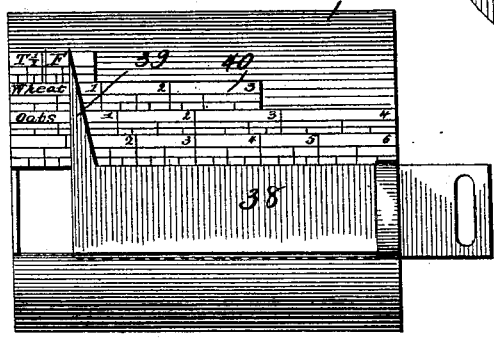

In the drawings hereto annexed, Figure 1 is a plan view of a machine constructed in accordance with my improvements. Fig. 2 is a vertical sectional view taken on the line 2 2 in Fig. 1. Fig. 3 is a perspective detail view showing the feed-roller and the feed-regulating slide. Fig. 4 is a vertical sectional view taken on the line 4 4 in Fig. 2. Fig. 5 is a vertical sectional view taken longitudinally through the operating-shaft. Fig. 6 is a side elevation of the ratchet-disk mounted upon the operating-shaft. Fig. 7 is a side view of the disk mounted upon the shaft of the feed-roller and carrying the operating dog or pawl. Fig. 8 is a perspective detail view of one end of the operating-shaft, showing the outside of the disk carrying the operating dog or pawl. Fig. 9 is a detail front elevation of the seed box or hopper, illustrating a modification in the arrangement of the feed-regulating slide. Fig. 10 is a detail view showing a modification of the clutch mechanism upon the operating-shaft. Fig. 11 is a sectional view taken on the line 11 11 in Fig. 2.

Like numerals of reference indicate like parts in all the figures.

1 designates the seed box or hopper, the sides of which are provided with bearings for the shaft 2, carrying the fluted feed-roller 3, which is mounted eccentrically in a casing 4, formed by the curved bottom 5 of the hopper. The latter is provided with an inclined partition 6, and it has bearings for a slide 7, the inner end of which has a downwardly-extending curved arm 8, which extends partially around the fluted feed-roller. The curved arm 8 has a groove 9 to receive a disk or ring 10, having tongues or scallops 11 to engage the grooves or flutes of the feed-roller upon which the said ring is mounted. Said ring, it will be observed, rotates with the feed-roller and forms a cut-off, which prevents the seed from passing beyond the curved arm 8. When the regulating-slide is adjusted, it carries the said ring to any desired position upon the feed-roller, thereby regulating the quantity of seed which shall be permitted to pass from the box or hopper. The hopper 1 is mounted upon brackets 12, arranged upon a base-board 13, which supports a box 14, which is arranged in front of the said hopper. The box 14 has a pivoted partition 15, provided with an arm 16, extending through a segmental slot 17 in the front side of the box and provided with a thumb-nut 18, which may be tightened so as to retain the said pivoted partition at any desired adjustment.

The shaft 2 of the feed-roller is provided outside the seed box or hopper with a sprocket-wheel $2^b$. $18^b$ designates the operating-shaft, which is journaled in suitable brackets or bearings $19^b$, and which carries a disk 19, having an annular rim or flange 20, provided on its outer side with sprockets 21 and on its inner side with teeth or ratchets 22.

23 designates a disk which is mounted loosely adjacent to the disk 19 and which is provided with a pivotal pin 24, having squared ends. Upon the inner end of the pin 24 is mounted a dog or pawl 25, adapted to engage the ratchets 22 of the disk 19. The pawl 25 is provided with flat shoulders 26 and 27, either of which may be engaged by the spring 28, which will serve to hold the pawl 25 into or out of engagement with the ratchets 22, as may be desired. The outer end of the pin 24 carries a lever or handle 29, by means of which it may be readily turned to adjust the pawl 25 to the desired position. The hub 30 of the disk 23 has a set-screw 31, serving for the attachment of a slotted block 32, the outer end of which has a lug 33 for the attachment of one end of a spring 34, which is coiled around the shaft $18^b$, and the opposite end of which is attached to a lug 35 upon a collar 36, which is secured adjustably upon the said shaft by means of the set-screw 37. The disk 19, having the sprockets 21, is adapted to receive motion by means of a chain or other suitable operating mechanism, and the shaft 18$^b$ has a sprocket-wheel 36$^b$, connected by a chain 37$^b$ with the sprocket-wheel 2$^b$. It will be seen that when the disk 19 is rotated in the proper direction, when the pawl 25 is in engagement with the ratchets 22, it will communicate a rotary motion to the shaft 18$^b$ and thence to the shaft 2, carrying the feed-roller, through the disk 23, the spring 34, and the collar 36. The spring 34 serves to prevent any shock which might be caused by a too sudden start of the machine, and which might prove injurious to the parts of the same.

The slide 7, having the curved arm 8 and serving for the adjustment of the disk 10, may be graduated to indicate the quantity of seed which is fed by the fluted roller. The latter throws the seed into the box 14, the pivoted partition 15 of which may be adjusted to any desired position, and the bottom of which may be provided with perforations for the escape of the seed.

In Fig. 9 of the drawings I have shown a modification of the invention, which consists in arranging the regulating-slide, which is in this instance denoted by 38, in front of instead of above the feed-roller. In this instance the regulating-slide is provided with an upwardly-extending arm or pointer 39, and a scale 40 is placed upon the front side of the seed box or hopper.

The operation of my invention and its advantages will be readily understood from the foregoing description, taken in connection with the drawings hereto annexed, by those skilled in the art to which it appertains.

The construction of the machine is simple and inexpensive, and the quantity of seed to be planted thereby may be easily and accurately regulated.

In Fig. 10 of the drawings I have shown a modification of my invention, which consists in providing the operating-shaft 18$^a$ with a disk or clutch member 61, adapted to be engaged by a sliding clutch member 62, normally held in contact therewith by a spring 63, and having a hub or collar 64, which is provided with an annular groove 65, adapted to be engaged by means of a bifurcated operating-lever 66, by means of which the clutch member 62 may be forced against the tension of the spring 63 to throw it out of engagement with the clutch member 61 when desired.

The spring 63, like the spring 34, above described, may be secured at one end to a collar 36 and at the other end to a slotted block 32, mounted adjustably upon the hub 64, so that the said spring may serve to prevent any shock to which the machine may be subjected in starting.

Having thus described my invention, I claim and desire to secure by Letters Patent of the United States—

1. The combination of the hopper, the shaft carrying the feed-roller, the operating-shaft, a disk mounted loosely upon said shaft and having an annular flange provided on its outer side with sprockets and on its inner side with teeth or ratchets, a disk mounted loosely and having a dog or pawl adapted to engage said ratchets, a coiled spring connecting the hub of the latter disk with a collar mounted securely upon the shaft of the feed-roller, and means for transmitting motion from the operating-shaft to the shaft carrying the feed-roller, substantially as set forth.

2. The combination of the hopper, the shaft journaled in the sides of the frame and carrying the feed-roller, the operating-shaft, the loose disk 19, having the flange 20, provided with sprockets 21 and ratchets 22, the loose disk 23, mounted adjacent to the disk 19 and having a pivotal pin carrying a pawl 25, provided with flat faces 26 and 27, a handle 29, a spring 28, secured to the disk 23 and adapted to engage either of the faces 26 and 27 of the pawl 25, a block 32, mounted upon the hub of the disk 23, a collar 36, mounted securely upon the shaft of the feed-roller, a coiled spring connecting the said collar with the block 32, and means for transmitting motion from the operating-shaft to the shaft carrying the feed-roller, substantially as and for the purpose set forth.

In testimony that I claim the foregoing as my own I have hereto affixed my signature in presence of two witnesses.

VICTOR SWANFELDT.

Witnesses:
W. T. MORRISON,
JOHN R. HUTCHISON.